United States Patent
Waddington

(10) Patent No.: US 12,553,192 B2
(45) Date of Patent: Feb. 17, 2026

(54) COMPOSITION FOR A WATER PERMEABLE COURT SURFACE AND METHOD FOR PRODUCTION OF SAME

(71) Applicant: Poraflex Ltd, Surrey (GB)

(72) Inventor: Matthew William Waddington, Surrey (GB)

(73) Assignee: Poraflex Ltd, Surrey (GB)

( * ) Notice: Subject to any disclaimer, the term of this patent is extended or adjusted under 35 U.S.C. 154(b) by 222 days.

(21) Appl. No.: 18/264,966

(22) PCT Filed: Feb. 15, 2022

(86) PCT No.: PCT/GB2022/050403
§ 371 (c)(1),
(2) Date: Aug. 10, 2023

(87) PCT Pub. No.: WO2022/172038
PCT Pub. Date: Aug. 18, 2022

(65) Prior Publication Data
US 2024/0093437 A1    Mar. 21, 2024

(30) Foreign Application Priority Data
Feb. 15, 2021 (GB) ...................................... 2102073

(51) Int. Cl.
*E01C 13/06* (2006.01)
*B32B 7/12* (2006.01)
(Continued)

(52) U.S. Cl.
CPC ................ *E01C 13/06* (2013.01); *B32B 7/12* (2013.01); *B32B 11/044* (2013.01); *B32B 33/00* (2013.01); *B32B 37/1292* (2013.01); *B32B 38/162* (2013.01); *B32B 2255/10* (2013.01); *B32B 2255/26* (2013.01); *B32B 2260/025* (2013.01);
(Continued)

(58) Field of Classification Search
CPC ......... E01C 13/06; E01C 13/065; B32B 7/12; B32B 11/044; B32B 33/00; B32B 37/1292; B32B 38/162; B32B 2255/10; B32B 2255/26; B32B 2260/025; B32B 2260/046; B32B 2305/026
See application file for complete search history.

(56) References Cited

U.S. PATENT DOCUMENTS

2010/0130080 A1*  5/2010  Coninx ................ C09D 175/04
                                                                156/60

FOREIGN PATENT DOCUMENTS

| GB | 2095581 A | 10/1982 |
|----|-----------|---------|
| GB | 2346331 A | 8/2000 |
| WO | 8806971 A1 | 9/1988 |

OTHER PUBLICATIONS

Series 72 Endura-Shield, Product Data Sheet, obtained from https://web.archive.org/web/20200922033336/https://tnemec.com/products/series-72-endura-shield/ ( Sep. 22, 2020) (Year: 2020).*

(Continued)

*Primary Examiner* — Blaine Copenheaver
(74) *Attorney, Agent, or Firm* — Renner, Otto, Boisselle & Sklar, LLP.

(57) ABSTRACT

A water permeable court surface comprises a porous substrate (5) on which there is a porous rubber shock layer (3) on which is at least one layer (1,2) of an acrylic composition, wherein the acrylic composition comprises a two pack water based polyurethane.

24 Claims, 1 Drawing Sheet

(51) Int. Cl.
- *B32B 11/04* (2006.01)
- *B32B 33/00* (2006.01)
- *B32B 37/12* (2006.01)
- *B32B 38/16* (2006.01)

(52) U.S. Cl.
CPC ... *B32B 2260/046* (2013.01); *B32B 2305/026* (2013.01)

(56) References Cited

OTHER PUBLICATIONS

International Preliminary Report on Patentability for corresponding International application No. PCT/GB2022/050403 dated Aug. 15, 2023.

International Search Report and Written Opinion for corresponding International Application No. PCT/GB2022/050403, mailed on May 20, 2022.

\* cited by examiner

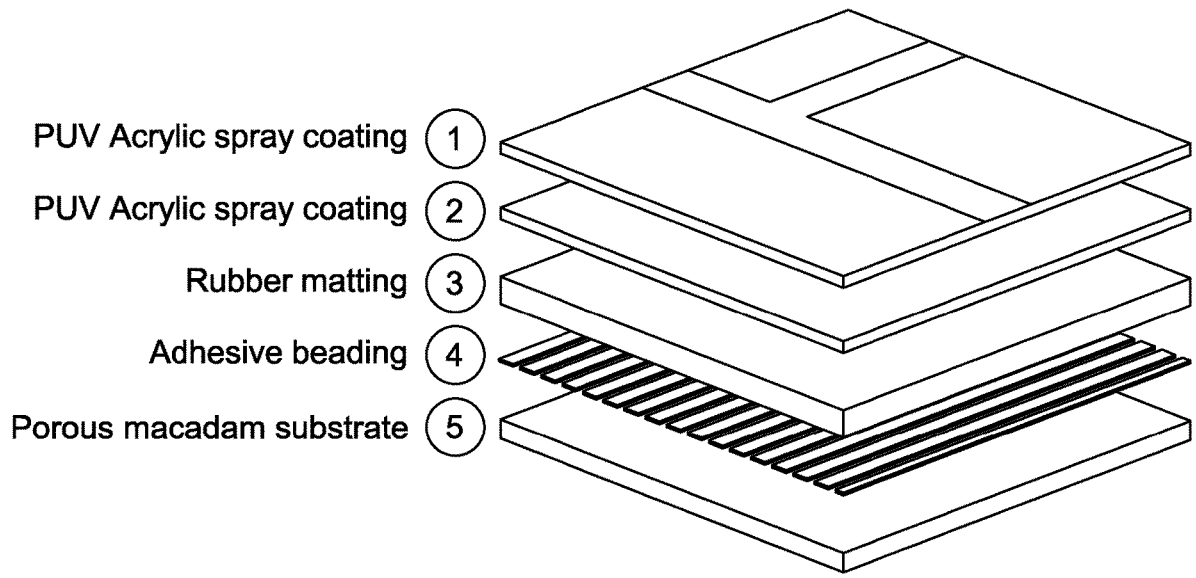

COMPOSITION FOR A WATER PERMEABLE COURT SURFACE AND METHOD FOR PRODUCTION OF SAME

This application is a national phase of International Application No. PCT/GB2022/050403 filed on Feb. 15, 2022, which claims priority to United Kingdom Application No. 2102073.0 filed on Feb. 15, 2021, each of which is hereby incorporated herein by reference in its entirety.

The present invention relates to a composition suitable for use as a surface in playing sports and games. In particular, the invention relates to a composition suitable for use as a tennis court surface.

BACKGROUND OF THE INVENTION

Surfaces which are used for playing games such as tennis can be made of a bituminous composition of the type sold under the trade names "Tarmac" or "Macadam". This surface is hard wearing, is normally black and has been widely used for a long period of time.

For games such as tennis a surface comprising an acrylic coating can be used, this includes a coating of an acrylic composition which can be applied by spray coating or by wet application e.g. using a squeegee. A coating comprising a layer of an appropriate thickness can be provided in a range of colours. Where the acrylic coating is spray applied the surface can remain porous so that surface water passes through and does not lie on the surface. This enables the surface to be played on when conditions are wet. In contrast, where the acrylic coating is squeegee applied the surface can be sealed and impervious to water which can result in water retention and ponding. This type of surface is commonly known as "Hardcourt".

Acrylic surfaces are available which incorporate cushioning layers. This gives the advantages of a softer playing surface and a preferred ball bounce speed and bounce height etc. However these surfaces are non-porous and therefore problematic in wet weather.

In light of the problems discussed above, various proposals have been made, but there remains a need for an improved surface which address one or more of the problems presented by prior art arrangements. In this regard, the present invention seeks to provide an alternative surface which preferably addresses one or more of the problems presented by prior art arrangements.

SUMMARY OF THE INVENTION

In accordance with a first aspect of the present invention there is provided a composition for a water permeable court surface which comprises a porous substrate on which there is a porous rubber shock layer on which is at least one layer of acrylic composition, wherein the acrylic composition comprises a two pack water based polyurethane.

In addition, the invention provides a water permeable court surface which comprises a porous substrate on which there is a porous rubber shock layer on which is at least one layer of acrylic composition, wherein the acrylic composition comprises a two pack water based polyurethane.

Preferably, the acrylic composition comprises a first component which comprises an organic solvent-free aqueous dispersion of copolymer based on an aliphatic polycarbonate polyurethane and a polyacrylate. Preferably, the first component is blended with a second component, which is a water miscible polyisocyanate. The resulting composition is then be blended with water based acrylic.

Preferably, the porous substrate is preferably of a bituminous or tar derived material of the type currently used. Advantageously, as this substrate is not actually played on directly, it need not be as hard wearing as surface tarmac layers.

Preferably, the rubber shock layer is of rubber granules bonded together by a polyurethane binder.

Preferably, the rubber granules have a granule size having a diameter of from about 1 to about 3 mm. However the granule size is not critical.

It is critical that the correct ratio of granule and binder content is used so this layer is water permeable.

Preferably, layers having a thickness of about 4 mm to about 6 mm are provided. However, this layer can be of any thickness depending on the use. Advantageously, in general the thicker the layer the better the cushioning affect.

Preferably, the rubber is a conventional rubber material. Preferably, it is a natural or synthetic rubber. Preferably, the rubber contains conventional additives such as fillers etc. and can be treated to have desired properties. Such rubber materials are widely available in sheet form.

Preferably, the rubber shock layer comprises a mat formed from granules having a diameter of about 1 mm to about 3 mm. Preferably, the granules are obtained from recycled truck or aircraft tyres. Granules from more commonly used car tyres are not used because mats formed from car tyres are more likely to have small amounts of metal which could prove dangerous when used for sports surfaces.

Preferably the rubber shock layer is fixed to the substrate by means of an adhesive.

Preferably, the adhesive is a two part polyurethane adhesive. This type of adhesive is commonly available however, for the purposes of the invention an adhesive having a low viscosity is used to enable the correct flow to be achieved through the application device.

Preferably, the adhesive is applied in "bead" form whereby beads of glue are formed in lines, which are preferably parallel, with gaps in between to allow water to pass therethrough.

Preferably, the adhesive is not applied by means of dot gluing. Dot gluing has been found to be very labour intensive.

Preferably, the beads of adhesive and the gaps between the beads of adhesive are about 10 mm wide.

Preferably, a specially designed piece of equipment is used for applying and distributing the adhesive. The equipment comprises a wheeled trolley with a trough to contain the adhesive which pivots and has holes at one end. When wheeled across the surface and angled correctly the adhesive pours through the holes forming beads of adhesive on the ground.

In an alternative embodiment, the adhesive is applied in a method with comprises spraying the adhesive onto the porous substrate. Advantageously, this method does not cause the porous substrate to become impervious to water and allows water drainage to take place.

Preferably, the step of spraying the adhesive is carried out using a conventional airless spraying machine capable of handling the viscosity of the adhesive. Advantageously, this enables the adhesive to be sprayed more easily and uniformly.

Preferably, the adhesive comprises a unique formula which has be created specifically for this purpose. In this regard, preferably, the adhesive comprises a two component water based adhesive. Preferably, a first component comprises a solvent-free dispersion of copolymer based on an aliphatic polycarbonate polyurethane and a polyacrylate.

Preferably, a second component comprises a water miscible polyiscocyanate. Preferably, the first component is blended with the second component prior to use to form a blended mixture. Advantageously, the blended mixture has been found to provide excellent adhesion to both the porous substrate and the rubber shock layer. In addition, advantageously, it has been found that the adhesive provides allows the overall composition to be porous.

Preferably, once the adhesive has set the rubber shock layer is treated with a detergent of the type commonly available for floor cleaning. It has been found that this is critical as it breaks down lubricating agents present in the rubber, which if untreated prevent adhesion of the subsequent coatings.

Preferably, the detergent comprises a heavy duty, low foaming, floor cleaning detergent. Preferably the detergent comprises a product produced by Evans Vanodine known as "Lift" ®. Lift® comprises a blend of sodium metasilicate, anionic and non-ionic surfactants, sequestering agent, solubiliser and glycol ether.

As standard acrylic coatings commonly used on tennis courts will not adhere to the rubber mat, because of their chemical properties, a specially formulated acrylic composition comprising an acrylic resin together with a two part water based polyurethane adhesive is used which has excellent adhesion to the mat.

Preferably, the adhesive is a two part polyurethane adhesive. This type of adhesive is commonly available however, for the purposes of the invention an adhesive having a low viscosity is used to enable the correct flow to be achieved through the application device.

Preferably, this is blended with an acrylic resin and spray applied in two applications.

Preferably, a higher acrylic content in the final application is included to provide the preferred playing characteristics.

Preferably, a first coat contains about 20% to about 30% acrylic by weight. In contrast, preferably, a final coat comprises about 40% to about 50% acrylic by weight.

Advantageously, the final structure combines the advantages of a porous textured surface and a cushioned surface.

In accordance with a second aspect of the present invention there is provided a method for production of a composition for a water permeable court surface which comprises the steps of providing porous substrate, providing a porous rubber shock layer on top of the porous substrate and providing at least one layer of acrylic composition on top of the porous rubber shock layer, wherein the acrylic composition comprises a two pack water based polyurethane.

Preferably the method comprises the step of fixing a rubber shock layer to the substrate by means of an adhesive.

Preferably, the adhesive is a two part polyurethane adhesive. This type of adhesive is commonly available however, for the purposes of the invention an adhesive having a low viscosity is used to enable the correct flow to be achieved through the application device.

Preferably, the method comprises the step of applying adhesive in "bead" form whereby beads of glue are formed in lines, which are preferably parallel, with gaps in between to allow water to pass therethrough. Preferably, the beads of adhesive and the gaps between the beads of adhesive are about 10 mm wide.

Preferably, the method does not include the step of applying adhesive by means of dot gluing. Dot gluing has been found to be very labour intensive.

Preferably, the method comprises the step of using a specially designed piece of equipment for applying and distributing the adhesive. The equipment comprises a wheeled trolley with a trough to contain the adhesive which pivots and has holes at one end. When wheeled across the surface and angled correctly the adhesive pours through the holes forming beads of adhesive on the ground.

In an alternative embodiment, the method comprises the step of spraying the adhesive onto the porous substrate. Advantageously, this method does not cause the porous substrate to become impervious to water and allows water drainage to take place.

Preferably, the step of spraying the adhesive is carried out using a conventional airless spraying machine capable of handling the viscosity of the adhesive. Advantageously, this enables the adhesive to be sprayed more easily and uniformly.

Preferably, the adhesive comprises a unique formula which has be created specifically for this purpose. In this regard, preferably, the adhesive comprises a two component water based adhesive. Preferably, a first component comprises a solvent-free dispersion of copolymer based on an aliphatic polycarbonate polyurethane and a polyacrylate. Preferably, a second component comprises a water miscible polyiscocyanate. Preferably, the first component is blended with the second component prior to use to form a blended mixture. Advantageously, the blended mixture has been found to provide excellent adhesion to both the porous substrate and the rubber shock layer. In addition, advantageously, it has been found that the adhesive provides allows the overall composition to be porous.

Preferably, the method comprises the step of treating the rubber shock layer with a detergent. Preferably this step is carried out after the adhesive has set. Preferably, the detergent is of the type commonly available for floor cleaning. It has been found that this step is critical as it breaks down lubricating agents present in the rubber, which if untreated would prevent adhesion of the subsequent coatings.

Preferably, the detergent comprises a heavy duty, low foaming, floor cleaning detergent. Preferably the detergent comprises a product produced by Evans Vanodine known as "Lift" ®. Lift® comprises a blend of sodium metasilicate, anionic and non-ionic surfactants, sequestering agent, solubiliser and glycol ether.

As standard acrylic coatings commonly used on tennis courts will not adhere to the rubber mat, because of their chemical properties, a specially formulated acrylic composition comprising an acrylic resin together with a two part water based polyurethane adhesive is used which has excellent adhesion to the mat.

Preferably, the method includes the step of blending the two part water based polyurethane with an acrylic resin.

Preferably, the acrylic composition comprises a first component which comprises an organic solvent-free aqueous dispersion of copolymer based on an aliphatic polycarbonate polyurethane and a polyacrylate. Preferably, the first component is blended with a second component, which is a water miscible polyiscocyanate. The resulting composition is then be blended with water based acrylic.

Preferably, the method includes the step of applying the coating by spraying. Preferably, it is applied in two applications. Preferably, it is applied in only two applications.

Preferably, the method comprises the step of applying two layers of acrylic composition on top of the porous rubber shock layer. Preferably, only two layers of acrylic composition are provided on top of the porous rubber shock layer.

Preferably, the method comprises the step of applying a higher acrylic content in the final application to provide the preferred playing characteristics. Preferably, a first coat contains about 20% to about 30% acrylic by weight. In contrast, preferably, a final coat comprises about 40% to about 50% acrylic by weight.

Advantageously, the final structure combines the advantages of a porous textured surface and a cushioned surface.

Advantageously, the invention can be used to provide a surface for a tennis court and/or other sports. In this regard, it has been found that the surface provides a level of grip, ball speed and comfort comparable to traditional cushioned acrylic surfaces but with the added advantage of porosity for play in wet weather.

Many tennis courts are covered with an air dome to protect from the weather. A common problem with these domes is that they collect condensation which then drips onto the surface causing water retention to some areas. With the surface of the invention water is absorbed into the surface maintaining an even grip across the entire court.

Some existing surfaces provide both porosity and cushioning but none with the preferred playing characteristics and thickness of cushioning as the invention due to our unique use of specially designed coatings, surface treatment and method of application.

BRIEF DESCRIPTION OF THE DRAWINGS

The invention will now be further described with reference to the accompanying drawings in which:

FIG. 1 shows a diagram of an embodiment of the invention.

DETAILED DESCRIPTION OF THE INVENTION

It will be appreciated that aspects, embodiments and preferred features of the invention have been described herein in a way that allows the specification to be written in a clear and concise way. However, unless circumstances clearly dictate otherwise, aspects, embodiments and preferred features can be variously combined or separated in accordance with the invention. Thus, preferably, the invention provides a device having features of a combination of two or more, three or more, or four or more of the aspects described herein. In a preferred embodiment, a device in accordance with the invention comprises all aspects of the invention.

Within the context of this specification, the word "about" means plus or minus 20%, more preferably plus or minus 10%, even more preferably plus or minus 5%, most preferably plus or minus 2%.

Within the context of this specification, the word "substantially" means preferably at least 90%, more preferably 95%, even more preferably 98%, most preferably 99%.

Within the context of this specification, the word "comprises" means "includes, among other things" and should not be construed to mean "consists of only".

The invention provides a water permeable court surface which comprises a porous substrate on which there is a porous rubber shock layer on top of which is at least one layer of acrylic composition. According to the invention, the structure of the surface combines the advantages of a porous textured surface and a cushioned surface. This provides the advantage that the invention can be used to provide a surface for a tennis court and/or other sports, because it provides a level of grip, ball speed and comfort comparable to traditional cushioned acrylic surfaces but with the added advantage of porosity for play in wet weather. Furthermore, many tennis courts are covered with an air dome to protect from the weather. A common problem with these domes is that they collect condensation which then drips onto the surface causing water retention to some areas. With the surface of the invention water is absorbed into the surface maintaining an even grip across the entire court.

As shown in FIG. 1, an embodiment of the invention comprises a porous substrate (5) on which there is a porous rubber shock layer (3) on top of which is at least one layer of acrylic composition (1) (2).

Preferably, the porous substrate (5) is of a bituminous or tar derived material of the type currently used.

The rubber shock layer (3) is of rubber granules bonded together by a polyurethane binder. The rubber granules have a granule size having a diameter of from about 2 mm. The rubber shock layer has a thickness of about 5 mm.

The rubber is a conventional rubber material and contains conventional additives such as fillers etc.

The rubber shock layer is fixed to the substrate by means of a two part polyurethane adhesive (4) having a low viscosity to enable the correct flow to be achieved through the application device and applied in "bead" form. The beads of glue (4) are formed in parallel lines with gaps in between to allow water to pass therethrough. The beads of adhesive (4) and the gaps between the beads of adhesive are about 10 mm wide.

A specially designed piece of equipment is used for applying and distributing the adhesive. The equipment comprises a wheeled trolley with a trough to contain the adhesive which pivots and has a plurality of holes defined at one end. When wheeled across the surface and angled correctly the adhesive pours through the holes forming beads of adhesive on the surface.

After the adhesive has set, the rubber shock layer is treated with a detergent which comprises a blend of sodium metasilicate, anionic and non-ionic surfactants, sequestering agent, solubiliser and glycol ether. It has been found that this is critical as it breaks down lubricating agents present in the rubber, which if untreated prevent adhesion of the subsequent coatings.

As standard acrylic coatings commonly used on tennis courts will not adhere to the rubber mat, because of their chemical properties, a specially formulated two part water based polyurethane composition is used. This composition has a first component which comprises an organic solvent-free aqueous dispersion of copolymer based on an aliphatic polycarbonate polyurethane and a polyacrylate, and a second component comprising a water miscible polyiscocyanate which is blended with the first component. The composition is further blended with an acrylic resin and spray applied in two applications.

The first application contains about 20% to about 30% acrylic by weight. In contrast, a higher acrylic content of about 40% to about 50% acrylic by weight is provided in the final application to provide the preferred playing characteristics.

EXAMPLES

Example 1

A taber abrasion test was carried out.

A taber abrasion test is a test to determine a plastic surface's resistance to abrasion.

A comparative test between a surface according to the invention as described above (Formula (a)) and a surface described in GB2346331 (Formula (b)) were tested:

Taber abrasion (CS 17) after 1000 cycles (a): Abrasion Result=24 mg weight loss (b): Abrasion Result=37 mg weight loss The results clearly showed that the surface of the invention performed better than the surface described in GB2346331.

Example 2

A second comparative test was carried out.

One sample of rubber mat was coated according to the invention and a second rubber mat was coated as described in GB2346331.

Once the surfaces were fully cured, they were rubbed together face to face constantly for such a period of time that it was possible to see that the surface coated as described in GB2346331 was wearing while the surface coated according to the invention was still intact.

This demonstrated that the surface according to the invention was remarkably more resistant to wear.

The above described embodiments have been given by way of example only, and the skilled reader will naturally appreciate that many variations could be made thereto without departing from the scope of the invention.

The invention claimed is:

1. A composite for a water permeable court surface which comprises a porous substrate on which there is a porous rubber shock layer on which is at least one layer of an acrylic composition, wherein the acrylic composition comprises a two part water based polyurethane and wherein the acrylic composition comprises a first component which comprises an organic solvent-free aqueous dispersion of a copolymer based on an aliphatic polycarbonate polyurethane and a polyacrylate.

2. The composite according to claim 1, wherein the first component is blended with a second component, which is a water miscible polyiscocyanate.

3. The composite of claim 2, wherein the first component and the second component are blended with a water based acrylic.

4. The composite of claim 1, wherein the porous substrate is of a bituminous or tar derived material.

5. The composite of claim 1, wherein the rubber shock layer is formed of rubber granules bonded together by a polyurethane binder.

6. The composite of claim 5, wherein the rubber granules have a granule size having a diameter of from about 1 to about 3 mm.

7. The composite of claim 1, wherein the rubber shock layer has a thickness of about 4 mm to about 6 mm.

8. The composite of claim 1, wherein the rubber shock layer is fixed to the substrate by means of an adhesive.

9. The composite of claim 8, wherein the adhesive is a two part polyurethane adhesive.

10. The composite of claim 8, wherein the adhesive is applied in the form of beads.

11. The composite of claim 10, wherein a gap is provided between the beads of adhesive are about 10 mm wide.

12. The composite of claim 1, wherein the rubber shock layer is treated with a detergent.

13. The composite of claim 12, wherein the detergent comprises a blend of sodium metasilicate, anionic and non-ionic surfactants, sequestering agent, solubiliser and glycol ether.

14. The composite of claim 1, wherein the acrylic composition is spray applied in two applications.

15. The composite of claim 14, wherein the acrylic composition applied in a first application contains about 20% to about 30% acrylic by weight.

16. The composite of claim 14, wherein a final coat comprises about 40% to about 50% acrylic by weight.

17. A method for production of the composite of claim 1 for a water permeable court surface which comprises the steps of providing a porous substrate, providing a porous rubber shock layer on top of the porous substrate and providing at least one layer of acrylic composition on top of the porous rubber shock layer, wherein the acrylic composition comprises a two pack water based polyurethane.

18. The method of claim 17, wherein the method comprises the step of fixing a rubber shock layer to the substrate by means of an adhesive.

19. The method of claim 18, wherein the method comprises the step of applying adhesive in bead form whereby beads of glue are formed in substantially parallel lines with gaps in between to allow water to pass therethrough.

20. The method of claim 18, wherein the method does not include the step of applying adhesive by means of dot gluing.

21. The method of claim 17, wherein the method comprises the step of treating the rubber shock layer with a detergent.

22. The method of claim 17, wherein the method includes the step of blending the two part water based polyurethane with an acrylic resin.

23. The method of claim 17, wherein the method includes the step of applying the acrylic composition by spraying.

24. The method of claim 17, wherein the step of applying the acrylic composition is applied in two applications.

* * * * *